US012459287B2

(12) United States Patent
Renz et al.

(10) Patent No.: US 12,459,287 B2
(45) Date of Patent: Nov. 4, 2025

(54) APPARATUSES AND METHODS FOR PRINTED SECURITY FEATURES

(71) Applicant: Illinois Tool Works Inc., Glenview, IL (US)

(72) Inventors: Robert Phillip Renz, Ipswich (GB); Morven McAlpine, Ipswich (GB)

(73) Assignee: Illinois Tool Works Inc., Glenview, IL (US)

( * ) Notice: Subject to any disclaimer, the term of this patent is extended or adjusted under 35 U.S.C. 154(b) by 143 days.

(21) Appl. No.: 18/188,298

(22) Filed: Mar. 22, 2023

(65) Prior Publication Data

US 2023/0219361 A1 Jul. 13, 2023

Related U.S. Application Data

(60) Division of application No. 16/524,758, filed on Jul. 29, 2019, now Pat. No. 11,642,908, which is a
(Continued)

(51) Int. Cl.
*B42D 25/351* (2014.01)
*B41J 11/44* (2006.01)
(Continued)

(52) U.S. Cl.
CPC ............... *B42D 25/45* (2014.10); *B41J 11/44* (2013.01); *B41J 13/0027* (2013.01); *B41M 5/38214* (2013.01); *B41M 5/38264* (2013.01); *B41M 5/40* (2013.01); *B41M 5/41* (2013.01); *B41M 5/42* (2013.01); *B42D 25/23* (2014.10); *B42D 25/24* (2014.10); *B42D 25/29* (2014.10); *B42D 25/309* (2014.10); *B42D 25/318* (2014.10); *B42D 25/328* (2014.10); *B42D 25/351* (2014.10); *B42D 25/405* (2014.10);
(Continued)

(58) Field of Classification Search
CPC ........ B42D 25/23; B42D 25/24; B42D 25/29; B42D 25/309; B42D 25/318; B42D 25/351
See application file for complete search history.

(56) References Cited

U.S. PATENT DOCUMENTS

| | | | |
|---|---|---|---|
| 4,977,136 | A | 12/1990 | Yoshio et al. |
| 5,387,573 | A | 2/1995 | Oldfield et al. |

(Continued)

FOREIGN PATENT DOCUMENTS

| | | | |
|---|---|---|---|
| CA | 2677278 A1 * | 8/2008 | ............. B42D 25/21 |
| EP | 0407615 | 1/1991 | |

(Continued)

OTHER PUBLICATIONS

Extended European Search Report for co-pending European application No. 17194772.4 mailed May 4, 2018 (14 pages).

(Continued)

*Primary Examiner* — Gerard Higgins
(74) *Attorney, Agent, or Firm* — Christopher R. Carroll; Small Patent Law Group LLC

(57) ABSTRACT

A visual security feature is provided that is disposed on a target. The visual security feature includes two substantially transparent layers. At least one of the two substantially transparent layers is present in an image-wise pattern.

19 Claims, 2 Drawing Sheets

Related U.S. Application Data continuation of application No. 15/638,996, filed on Jun. 30, 2017, now Pat. No. 10,363,770.

(60) Provisional application No. 62/404,651, filed on Oct. 5, 2016.

(51) Int. Cl.

| | |
|---|---|
| ***B41J 13/00*** | (2006.01) |
| ***B41M 5/382*** | (2006.01) |
| ***B41M 5/40*** | (2006.01) |
| ***B41M 5/41*** | (2006.01) |
| ***B41M 5/42*** | (2006.01) |
| ***B42D 25/23*** | (2014.01) |
| ***B42D 25/24*** | (2014.01) |
| ***B42D 25/29*** | (2014.01) |
| ***B42D 25/309*** | (2014.01) |
| ***B42D 25/318*** | (2014.01) |
| ***B42D 25/328*** | (2014.01) |
| ***B42D 25/405*** | (2014.01) |
| ***B42D 25/45*** | (2014.01) |
| ***B42D 25/48*** | (2014.01) |

(52) U.S. Cl.
CPC ......... *B42D 25/48* (2014.10); *B41M 2205/02* (2013.01); *B41M 2205/06* (2013.01); *B41M 2205/30* (2013.01)

(56) References Cited

U.S. PATENT DOCUMENTS

| | | | |
|---|---|---|---|
| 6,146,032 | A | 11/2000 | Dunham |
| 8,614,806 | B2 | 12/2013 | Brewington |
| 2014/0270884 | A1 | 9/2014 | Landry et al. |
| 2014/0272325 | A1 | 9/2014 | Renz et al. |

FOREIGN PATENT DOCUMENTS

| | | |
|---|---|---|
| EP | 0817726 | 1/1998 |
| EP | 1206356 | 5/2002 |
| KR | 20130087017 | 8/2013 |
| WO | 9807578 | 2/1998 |
| WO | 2005062978 | 7/2014 |

OTHER PUBLICATIONS

European Exam Report for co-pending European application No. 117194772.4 mailed Jun. 4, 2021 (7 pages).

* cited by examiner

APPARATUSES AND METHODS FOR PRINTED SECURITY FEATURES

RELATED APPLICATIONS

The present application is a divisional of, and claims priority to, U.S. patent application Ser. No. 16/524,758, entitled "Apparatuses and Methods for Printed Security Features," filed Jul. 29, 2019 ("the '758 Application"). The '758 Application is a continuation of U.S. patent application Ser. No. 15/638,996, filed Jun. 30, 2017 ("the '996 Application"), which is now U.S. Pat. No. 10,363,770. The '996 Application claims priority to U.S. Provisional Application Ser. No. 62/404,651, filed Oct. 5, 2016 ("the '651 Application"). The subject matter of each of the '758 Application, the '996 Application, and the '651 Application is incorporated by reference herein in its entirety.

FIELD

Embodiments of the present disclosure generally relate to providing security features for printed objects, for example security features provided at a point or location of issuance.

BACKGROUND OF THE DISCLOSURE

Security documents such as ID cards and the like may be personalized with the information of a user and often contain a color photograph or monochrome photograph in the case of laser engraving. Extra security features may be used when producing ID documents and other documents of value. The merits of a security feature may be viewed in terms of a balance of four desirable properties: cost, durability, security and quality.

A range of security features exist for inclusion in the body of a card but these are not personalized to the individual owner of the card or document.

Security features may be added at point of issuance by using security ribbons containing such things as mass transferrable optically variable pigments, UV fluorescing pigments, dyes or the like. These types of security materials may be in the form of continuous ribbons in a multi-head, modular type printer or they may be added as a panel to a paneled color ribbon (e.g. YMCKUv) for use in a single-head desktop type printer. However, these types of security features may be restricted by their high material cost (i.e., they do not meet the cost criteria in the above list).

Printing, such as dye diffusion thermal transfer printing (also known as D2T2 or "dye-sublimation" printing) may be used to produce color images, such as photographic images of a person on identification documents. D2T2 may be used to provide high quality, full color photographs of a document owner. D2T2 media may be in the form of ribbons of different color for use in separate printing units in a multi-head modular printer, or may be in a paneled format for use in a single-head desktop printer.

In addition to photographic images, security features may be provided with identification documents or other documents. For example, pre-designed security laminates, such as holographic patches, may be used for security features. However, such security features are typically manufactured in large batches and are not personalized or individualized for an individual document holder.

Some security features may be added to a document using security ribbons using various printing materials. However, such security ribbons and/or associated materials may have a relatively high cost.

SUMMARY OF THE DISCLOSURE

Certain embodiments of the present disclosure provide a substantially clear mass transfer panel, used for image wise printing to a target followed by transfer of a protective top coat, to produce a visual effect. As used herein, a "target" may be understood as an object that is printed upon (e.g., an object upon which a security feature as discussed herein is printed upon).

Certain embodiments of the present disclosure provide a visual security feature disposed on a target. The visual security feature includes two substantially transparent layers. At least one of the two substantially transparent layers is present in an image-wise pattern. As the feature is disposed on the target, in some embodiments the feature may be understood as a portion of the target after being disposed on the target.

Certain embodiments of the present disclosure provide a thermal transfer sheet for printing to a target. The thermal transfer sheet includes a substrate, a substantially clear mass transfer panel capable of being printed image-wise, and a protective mass transfer panel. This thermal transfer sheet may optionally include plural dye diffusion panels, and a black mass transfer panel. The various panels mentioned above are disposed above the substrate.

Certain embodiments of the present disclosure provide a method of producing a security feature. The method includes printing, a security feature image-wise to the target with a clear material transferred from a mass transfer panel of the dye sheet. Further, the method includes applying a uniform top coat above at least the image.

Certain embodiments of the present disclosure provide a card that includes a base, an image, an image-wise security feature, and a protective top coat. The image is printed on the base. The image-wise security feature includes a clear material printed on the base. The protective top coat is uniformly applied over the base.

DETAILED DESCRIPTION OF THE DISCLOSURE

Figure 1:
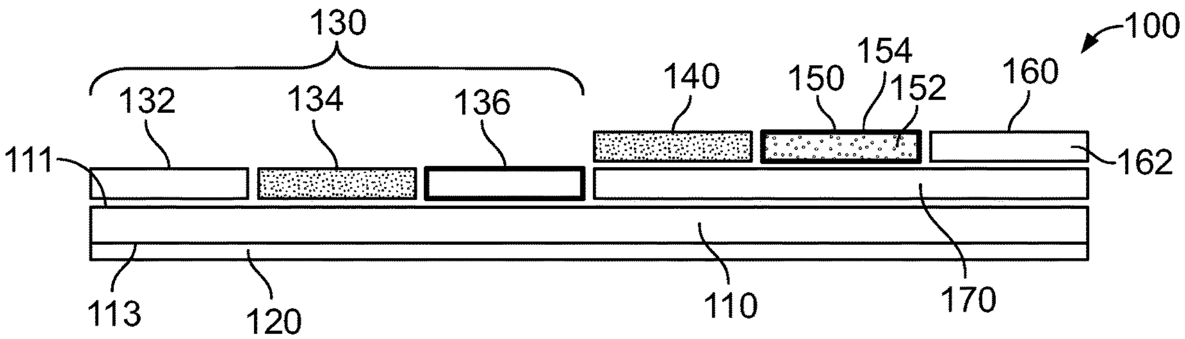
FIG. 1 provides a schematic view of a dye sheet in accordance with various embodiments.

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

Various embodiments will be better understood when read in conjunction with the appended drawings. To the extent that the figures illustrate diagrams of the functional blocks of various embodiments, the functional blocks are not necessarily indicative of the division between physical components. Thus, for example, one or more of the functional blocks may be implemented in a single component or unit or multiple components or units. Similarly, a given block may be implemented using two or more distinct physical components. It should be understood that the various embodiments are not limited to the arrangements and instrumentality shown in the drawings.

The exemplary teachings herein pertain, for example, to methods and techniques for better utilizing existing overlay media and improved overlay media to produce security features at point of issuance on identification (ID) documents at low cost. Various embodiments disclosed herein may be used in combination with any imaging technique. As one example, dye diffusion thermal transfer (D2T2) printing may be beneficially employed. Security features using various embodiments as discussed herein may be introduced at very low extra cost and utilize existing hardware used in standard, readily available printing systems (e.g., D2T2 printing systems).

Various embodiments provide, for example, methods or techniques for using thermal transfer media to produce security features at a point of issuance for an object to be printed. For example, the object to be printed may include identification documents, such as cards. Various embodiments may be used in conjunction with dye diffusion thermal transfer (D2T2) printing; however, it may be noted that other techniques of providing images or printing may be utilized alternatively or additionally in other embodiments. For example, other techniques that may be employed in various embodiments include one or more of mass transfer, laser engraving, or UV ink-jet printing.

Various embodiments provide printing methods and/or media for creating a security feature including an image visible in reflected light by printing an essentially transparent plastic material in an image-wise fashion followed by transfer of a transparent top coat. The top coat may be made of a similar material as the security feature in some embodiments, whereas different materials for the top coat and security feature may be used in other embodiments. In various embodiments, filler material may be used with the layer printed image-wise, for example, to enhance the visibility of the security feature. Transfer of two thermally transferrable polymeric materials, one of which is printed image-wise (which may be referred to as being from an image-wise mass transfer panel) as a security feature, while the other is printed as continuous panel (e.g., over virtually the entire surface of the card) (which may be referred to as a top coat) in various embodiments provides excellent protection while adding a security effect at point of issuance. It may be noted that in some embodiments the top coat may be provided before the security feature.

Various embodiments utilize a single layer polymer for use as the top coat and/or the image-wise mass transfer panel. The use of a single polymer layer in either or both of the image-wise mass transfer panel and protective layer panel provides various benefits. For example, adhesion between the printed security image and the protective topcoat may be good (e.g., if the image and topcoat are both a single polymer layer), and any plane of failure for tampering of the document will not be between the security feature and the topcoat, thus improving the durability of the security feature (addressing the durability requirement in the list above). Further, any potential problems of adhesion between the image-wise transferred material and the whole panel topcoat are removed or reduced.

The image-wise mass transfer layers and/or protective top-coat layers may be transferred from a releasing sub-coat, for example a cross-linked or UV cured releasing sub-coat on a polyester carrier. The material is released from a carrier (e.g., a cross-linked or UV cured coating on a base film), which may or may not include waxes, silicones, or the like to aid release of the top coat from the carrier. It may be noted that cross-linked or UV cured release coatings may not be required in various embodiments.

As noted above, in some embodiments, different formulations may be used for the material used for the image-wise security feature and the material used for the top coat, with the different materials having different adhesive properties. Accordingly, the materials may be chosen such that the image-wise layer material has lower adhesion to the card surface than the top coat, and/or reduced adhesion to the top coat. Such an arrangement provides image-wise areas of altered card to top coat adhesion thus resulting in image-wise planes of failure, which could be used advantageously to create a tamper evident point of issuance security feature.

Further, in various embodiments, additional layers may be employed to differentiate between the image-wise mass transfer material and the mass transferred top coat. As one non-limiting example, a coating may be applied on to either the top coat or the image-wise layer. For instance, the extra coating may contain filler particles and/or additives to enhance the visibility of a security feature of the image-wise layer.

Further, in various embodiments, by way of example and not limitation, a filler material may be included, for improved visibility, directly in to the image-wise mass transfer layer. Different polymers or polymers with additives such as fillers may be used in various embodiments. The polymers and/or additives may be selected such that adhesion between the two layers is good, and/or other beneficial attributes of the single polymer as discussed herein are maintained.

One example of additives that can be used to enhance the visibility of the security feature is provided by UV fluorescent materials. Such materials may be applied directly to either the imaging layer (e.g., a layer including a color photograph) or the top coat layer, or to both. Such materials may be used in various embodiments to provide a security feature for which the visibility in reflected light coincides with the fluorescence, thereby enhancing the perceived security. When the fluorescent material is present in both the top coat and the image layers, the fluorescence of the printed image is enhanced and appears brighter than a standard fluorescent feature. Optionally, multiple UV fluorescent additives may be used, with a first added to the imaging layer and a second, of a different color than the first, added to the top coat layer. Where differently colored fluorescent additives are used, the visibility of the initial fluorescence may be affected to produce an alternate color.

In embodiments where a release layer (e.g., a release layer or subcoat disposed beneath a mass transfer panel of a dye sheet) is employed, a UV fluorescent material may be added to the release layer. For example, UV materials that are solvent soluble and of similar molecular weight and size as dyes used in D2T2 printing may be employed. When these dye-like UV fluorescent additives are present in the release coat, they may transfer to the mass transfer image-wise and/or protective layer even though not initially contained with the imaging or protective layer prior to the printing process. A diffusion process is induced of the dye-like fluorescent material from the release layer to the imaging and/or top coat layer during the intended mass transfer process of printing the imaging and top coat polymer layers.

It may be noted that use of the same polymer in both a top coat mass transfer panel and an image-wise mass transfer panel may provide a relatively visually subtle security feature. If a more visually obvious effect is desired, materials may be used to affect the glossiness and/or transparency of the material to be printed image-wise, for example. In some embodiments, a filler may be added to the polymeric material to be printed image-wise, or the coating method may be altered to alter gloss levels. Additionally or alternatively, an undercoat or release coat underneath the image-wise mass transfer panel may be altered to change the gloss level (e.g., reduce the gloss level). For example, a non-transferable filler material may be added, with the filler material not transferring with the image-wise polymer layer but instead remaining with the release layer. Such a release layer with filler may provide a matte effect to the image-wise transferred polymer, thereby providing an alteration in gloss between the image-wise layer (transferred from above the filled material) and the top coat layer (transferred from above a non-filled material). The below charts provide example visual effects of different combinations of different combinations of materials for a top coat layer and an image-wise layer.

While various embodiments discussed herein may be discussed in the context of card printing, it may be noted that the present disclosure need not be limited to card printing. Other targets may be utilized in other embodiments. For example, various embodiments may be used to provide point-of-issuance security features to retransfer media as well. Various embodiments may be used with clear re-transfer film or holographic re-transfer film. As used herein, the term "re-transfer" refers to a thermal transfer printing process in which an image is printed onto a transparent coating on a carrier film rather than directly into or onto a card. The printed image on the carrier film may then be transferred onto a card or other substrate. The transfer to the card or other substrate may be accomplished, for example, with either a hot roller or a thermal print head.

The chart below describes visual effects for direct to card printing in various example embodiments:

| Material 1 | Material 2 | Effect |
|---|---|---|
| Low molecular weight polyester resin | Low molecular weight polyester resin | Only visible in reflected light |
| Low molecular weight polyester resin | Low molecular weight polyester resin + $TiO_2$ | Visible in reflected light; lightly visible in direct light due to slight color shift, especially at high or low density |
| Low molecular weight polyester resin | Low molecular weight polyester resin + Tego A115 | Only visible in reflected light |
| Low molecular weight polyester resin | Low molecular weight polyester resin/polyurethane + glass bead undercoating | Very visible in reflected light-large gloss difference |
| Low molecular weight polyester resin | Low molecular weight polyester resin + glass bead undercoating | Very visible in reflected light |

The chart below describes visual effects for printing to re-transfer media in various example embodiments:

| Material 1 | Material 2 | Effect |
|---|---|---|
| Essentially clear re-transfer film | Low molecular weight polyester resin | Very lightly visible in reflected light |
| Essentially clear re-transfer film | Low molecular weight polyester resin + $TiO_2$ | Lightly visible in reflected light |
| Essentially clear re-transfer film | Low molecular weight polyester resin/ polyurethane + glass bead undercoating | Very visible in reflected light-large gloss difference |
| Holographic re-transfer film | Low molecular weight polyester resin/ polyurethane + glass bead undercoating | Very visible in reflected light-large gloss difference |

Embodiments of the present disclosure provide systems and methods for providing printed security features. Various embodiments provide low cost printing of security features at a point of issuance. Various embodiments provide improved security and/or convenience of verifying an identity using a printed document such as a card or license. Various embodiments provide for use of uniquely tailored, customized, or individualized security features.

FIG. 1 provides a schematic view of a thermal transfer sheet (or ribbon) 100 in accordance with various embodiments. A dye sheet provides an example of a thermal transfer sheet. As discussed herein, the thermal transfer sheet 100 is adapted for providing point of issuance security features (e.g., security features that are individually tailored or customized for a particular card or other target for printing). The thermal transfer sheet 100 may be sized, shaped, and otherwise configured to be compatible with readily available printers, allowing the thermal transfer sheet 100 to be used with existing printers. Generally, the thermal transfer sheet 100 is configured for thermal printing, or the diffusion of dye and/or transfer of material to a target via heating. It may be noted that the particular arrangement of panels or other aspects of the thermal transfer sheet 100 shown in FIG. 1 are by way of example for illustrative purposes, and that other combinations or arrangements of panels or layers may be used in other embodiments (e.g., additional layers or panels added, a panel or layer shown in FIG. 1 removed, panels or layers positioned differently with respect to each other than as shown in FIG. 1). In some embodiments, the target to be printed on may be a card, such as a credit card or identification card or license. In other embodiments, the target may be a re-transferable film that is subsequently applied to another object.

As seen in FIG. 1, the depicted thermal transfer sheet 100 includes a substrate 110, a back coat 120, plural dye diffusion panels 130, a black mass transfer panel 140, an image-wise mass transfer panel 150, a protective mass transfer panel 160, and a releasing sub-coat 170. Generally, the various panels or other aspects of the thermal transfer sheet 100 are configured to allow for printing of an image on a target alone with a customized or tailored printed security feature, and a uniform protective coating.

The substrate 110 provides a base onto which other layers or panels may be disposed directly or indirectly. For example, in the illustrated embodiment, the plural dye diffusion panels 130 and the releasing sub-coat 170 are directly mounted to a first surface 111 of the substrate 110, and the back coat 120 is directly mounted to a second surface 113 of the substrate 110, with the second surface 113 opposite the first surface 111. The black mass transfer panel 140, the image-wise mass transfer panel 150, and the protective mass transfer panel 160 are mounted indirectly to the first surface 111 of the substrate 110 (e.g., mounted directly to the releasing sub-coat 170 which is in turn mounted directly to the substrate 110).

The back coat 120 in the illustrated embodiment is disposed farther away from a target for printing than the substrate 110. The back coat 120, for example, may be configured to aid transport across a thermal print head. Heat from a thermal print head may be transferred through the back coat 120 to the plural dye diffusion panels 130.

The plural dye diffusion panels 130, as seen in FIG. 1, are disposed above the substrate 110 (or closer to a target for printing than the substrate 110). It may be noted that panels of a thermal transfer sheet may be in contact with a target (e.g., mass transfer panels may be in contact with a target), or not in contact with a target (e.g., in embodiments employing ink jet printing or laser engraving). It may be noted that embodiments that use ink jet printing or laser engraving may not use thermal transfer sheets for a color image, but a security feature may be applied via thermal transfer sheet over the ink jet image, for example, which would result in contact with a thermal transfer sheet. Generally, under the influence of heat, dyes are diffused from the dye diffusion panels 130 into or on to a target to be printed upon, while an associated polymer remains on the thermal transfer sheet 100. In the illustrated embodiment, three different dye diffusion panels 130 are shown, namely a first dye panel 132 with yellow dye (or a yellow panel), a second dye panel 134 with magenta dye (or a magenta panel), and a third dye panel 136 with cyan dye (or a cyan panel). By mixing or arranging the amount and location of various different dyes, an image such as a photograph may be printed on the target using the dye diffusion panels 130.

While the illustrated embodiment shows dye diffusion panels for the formation of a color image prior to formation of the security feature as disclosed herein, it may be noted that the use of the security feature in combination with other personalization techniques is not limited to dye diffusion. Other methods of creation of a color image for use in combination with the security feature may be utilized, for example mass transfer printing. Further, other techniques used for creation of a primary personalized image, such as laser engraving, may be used in combination with the providing of a security image as discussed herein.

The black mass transfer panel 140, in the illustrated embodiment, is positioned after the dye diffusion panels 130 (to the right of the dye diffusion panels 130 in the illustrated example), and above the releasing sub-coat 170 (which is in turn above the substrate 110). The black mass transfer panel 140 in the illustrated embodiment includes a black resin material configured to be transferred to the target for printing barcodes and text, for example.

The image-wise mass transfer panel 150, for the embodiment depicted in FIG. 1, is positioned immediately after the black mass transfer panel 140 (to the right of the black mass transfer panel in the illustrated example), and above the releasing sub-coat 170 (which is in turn above the substrate 110). The depicted image-wise mass transfer panel 150 is configured to provide a clear material for printing on the target. As used herein, image-wise printing may be understood as printing of a material in a visually recognizable pattern that is not uniform over the target (e.g., the entire target). The image may be, for example, a representation of a human face; a word, number, or alphanumeric code; or a signature, as examples. The image-wise mass transfer panel 150 is configured to provide a security feature that is printed image-wise, in contrast to a security feature that is provided at the time of manufacture of a card or other target and which is uniform for all similarly manufactured cards or targets. The depicted image-wise mass transfer panel 150 is used in various embodiments to provide a security feature that is tailored, customized, or otherwise unique to a particular image or target. Generally, the clear material provided by the image-wise mass transfer panel 150 provides a readable image via changes in the reflection of light off the target where a security feature has been printed using the image-wise mass transfer panel 150.

Various different types of images may be provided as part of a security feature added to the target via the image-wise mass transfer panel 150. For example, an image of a person may be provided as a security feature. As another example, a word or number may be provided as a security feature. As one more example, a representation of a signature may be provided as a security feature. The particular configuration of the security feature, in contrast to existing security features that are similar for a number of cards or targets, may in various embodiments be tailored or customized at the time of printing, and unique to a particular individual card or target being printed. For example, for a particular identification card, a photograph of a person may be taken, and printed as an image on the identification card with dye diffusion layers 130. Then, a clear printed line representation of the photograph (or portion thereof) may be provided on the identification card using the image-wise mass transfer panel 150. While the line representation may be at a lower resolution than the photograph, the line representation may have sufficient resolution such that visual inspection of the line representation and the photograph image may be used to confirm that they match. As another example, a signature may be provided and scanned to be used on a printed portion using dye diffusion panels 130 and/or black mass transfer panel 140. Additionally, a copy or representation of the signature in clear material provided by image-wise mass transfer panel 150 (same or different size) may be printed on the card.

Accordingly, a user of a card (e.g., a card produced using a dye-sheet 100 that includes the image-wise mass transfer panel 150) may compare an aspect of a color and/or black portion (provided by the dye diffusion panels 130 and/or the black mass transfer panel 140) with a clear portion (provided via the image-wise mass transfer panel 150) for an individually tailored, unique security feature determined and/or provided at the point of printing or issuance. It may be noted that in various embodiments, a security feature provided via the image-wise mass transfer panel 150 may not match or correspond to a feature printed using the dye diffusion panels 130 and/or the black mass transfer panel 140, but instead may be independent of any images or features printed using the dye diffusion panels 130 and/or the black mass transfer panel 140, and/or any other printing or personalizing technique used prior to use of the disclosed security feature.

Figure 2:
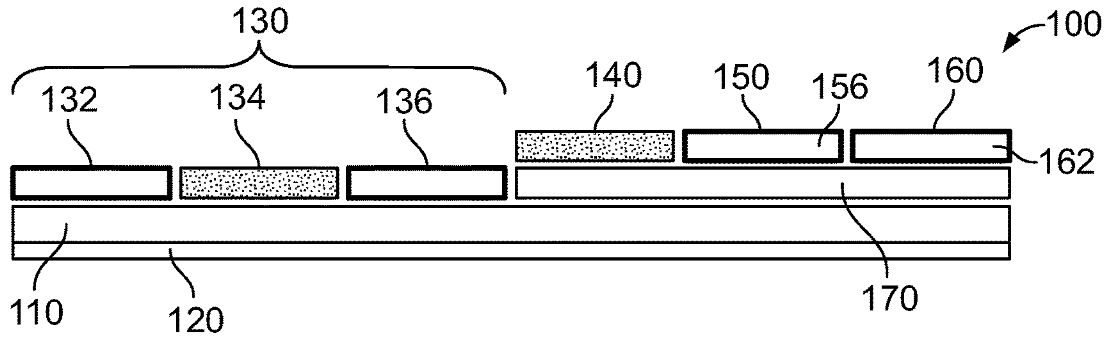
FIG. 2 provides a schematic view of an alternate arrangement of the dye sheet of FIG. 1.

The material used for the image-wise mass transfer panel 150 may be the same as or different from the material used for the protective mass transfer panel 160. In some embodiments, the material used for the image-wise mass transfer panel 150 may include additives and/or fillers, while in other embodiments, the image-wise mass transfer panel 150 may use a material that is free of additives or fillers. In the example depicted in FIG. 1, the image-wise mass transfer panel 150 uses a material 152 that is different from a material 162 used by the protective mass transfer panel 160. In FIG. 1, the material 152 includes an additive 154. In the example shown in FIG. 2, the image-wise mass transfer panel 150 uses a material 156 that is additive-free (e.g., unlike material 152, the material 156 does not include the additive 154). The material 156 in various embodiments is the same as the material 162 used by the protective mass transfer panel 160.

Returning to FIG. 1, the protective mass transfer panel 160, for the embodiment depicted in FIG. 1, is positioned immediately after the image-wise mass transfer panel 140, and above the releasing sub-coat 170 (which is in turn above the substrate 110). The protective mass transfer panel 160 is configured to provide a uniform, protective coating, at or near a top surface of the target (e.g., over an image printed by the dye diffusion layers 130 and/or the black mass transfer panel 140 (and/or any other printing or personalizing technique used prior to use of the disclosed security feature). The uniform protective coating provided by the protective mass transfer panel 160 may in various embodiments cover all or substantially all of a top surface of the target, and may be understood as a protective overlay. Generally, the protective mass transfer panel 160 provides a clear, durable, protective coat or layer to the target. The protective mass transfer panel 160, for example, may transfer the same material, or a common material, as is provided by the image-wise transfer panel 150; however, the material provided by the protective mass transfer panel 160 is in a uniform covering in contrast to a visually recognizable image. Use of the same material (e.g., the same clear polymer) for both the protective mass transfer panel 160 and the image-wise mass transfer panel in various embodiments provides for reliable adhesion between portions of the target provided by the respect mass transfer panels. In some embodiments, the protective mass transfer panel 160, for example, may transfer a different material than is provided by the image-wise transfer panel 150. For example, one of the materials may provide a different level of glossiness than the other material. Use of different materials in various embodiments provides for more pronounced visual effects (whereas use of the same material in the protective mass transfer panel 160 and the image-wise mass transfer panel may provide more subtle visual effects).

One benefit of a security feature formed with essentially clear image-wise mass transfer panels in combination with a top coating is that the underlying colored image or personalized information is not obscured by the security feature covering the image. The personal information printed on the target prior to addition of the security feature is clearly legible and identifiable when viewed at any angle despite use of the visual security feature on top of some or all of the pre-printed personal information.

The releasing sub-coat 170 is depicted in the illustrated example as being positioned after the dye diffusion layers 130, above the substrate 110, and beneath the black mass transfer panel 140, image-wise mass transfer panel 150, and protective mass transfer panel 160 (or interposed between the substrate 110 and the mass transfer panels). The releasing sub-coat 170 may be interposed between the substrate and coating layers, and is configured to aid release of coating materials during a printing process. For example, the releasing sub-coat 170 may include a cross-linked acrylic coating.

Figure 3:
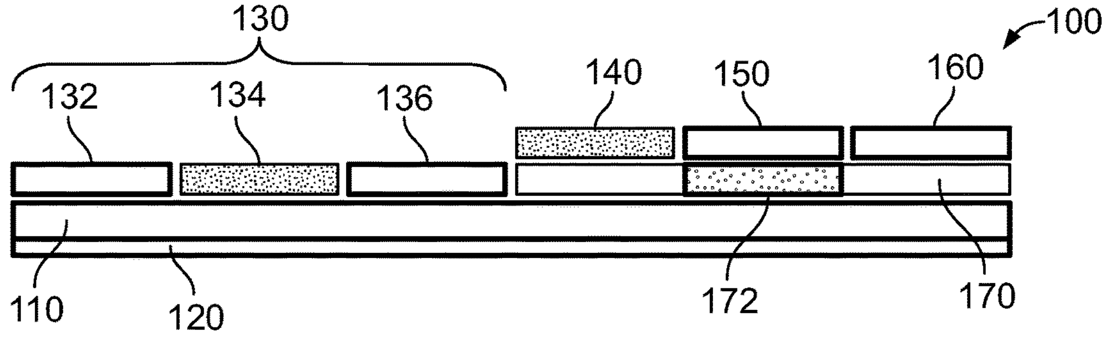
FIG. 3 provides a schematic view of an alternate arrangement of the dye sheet of FIG. 1.

Generally, the releasing sub-coat is configured to aid release of mass transfer panel material(s) from the substrate to the target. It may be noted that in some embodiments, for example as depicted in FIG. 1, the releasing sub-coat 170 is generally uniformly constructed beneath all of the mass transfer panels. However, in some embodiments, an altered sub-coat portion may be disposed beneath one or more mass transfer panels. For example, as seen in FIG. 3, the releasing sub-coat 170 comprises an altered sub-coat portion 172 disposed underneath the image-wise mass transfer layer 150 but not beneath the black mass transfer layer 140 or the protective mass transfer layer 160. The altered sub-coat portion 172 in the illustrated embodiment differs from the other portions of the releasing sub-coat 170 in that the altered sub-coat portion 172 contains a material such as a filler configured to create a matte effect on material released from the mass transfer layer disposed above it, which is the image-wise mass transfer portion 150 in the illustrated example. Accordingly, an image-wise security feature provided using the image-wise mass transfer portion 150 may have a more matte-like appearance than a uniform coat provided by the protective mass transfer portion 160, even if the image-wise mass transfer portion 150 and the protective mass transfer portion 160 utilize the same material. It may be noted that the above discussed example is provided for illustrative purposes and not by way of limitations, as other variations in the releasing sub-coat 170 and/or altered sub-coat portion 172 may be used to provide other visual effects in various embodiments.

With continued reference to FIG. 1, it may be noted that the portions of the thermal transfer sheet 100 used to diffuse dye and/or transfer mass for printing to the target may be arranged in a particular order corresponding to an order of printing. For example, in the example illustrated in FIG. 1, printing from the thermal transfer sheet 100 may be accomplished in a series of passes, progressing from left to right as seen in FIG. 1. For example, a first printing pass may be performed using the first dye panel 132 (e.g., heating the first dye diffusion portion 132 to diffuse dye to the target), a second printing pass may be performed using the second dye panel 134, a third printing pass may be performed using the third dye panel 136, a fourth printing pass may be performed using the black mass transfer portion 140, a fifth printing pass may be performed using the image-wise mass transfer portion 150 (e.g., to provide an image-wise security feature), and a sixth printing pass may be performed using the protective mass transfer portion 160 (e.g., to provide a protective top coat). Accordingly, in such a printing order, the uniform protective top coat provided via the protective mass transfer portion 160 is disposed above all of the printed portions, providing reliability and durability.

Figure 4:
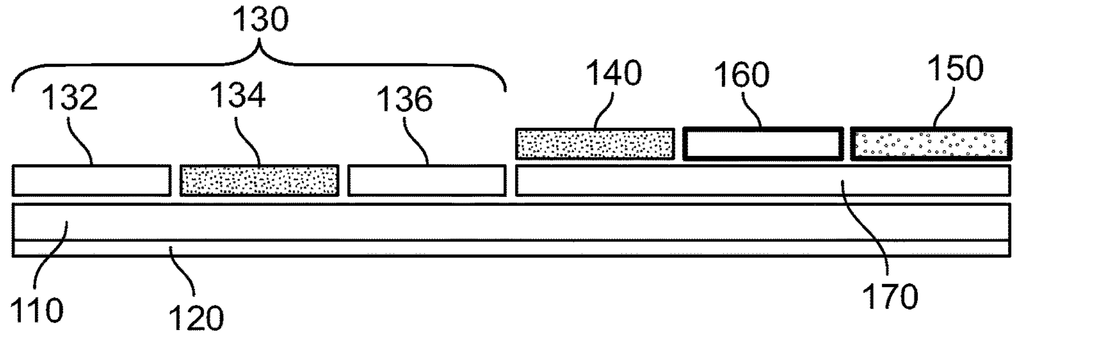
FIG. 4 provides a schematic view of an alternate arrangement of the dye sheet of FIG. 1

It may be noted that other printing orders may be employed in other embodiments. For example, in the example embodiment depicted in FIG. 4, the positions of the image-wise mass transfer portion 150 and the protective mass transfer portion 160 have been switched relative to the example depicted in FIG. 1. In the example illustrated in FIG. 4, printing from the thermal transfer sheet 100 may be accomplished in a series of passes, progressing from left to right as seen in FIG. 4. For example, a first printing pass may be performed using the first dye panel 132 (e.g., heating the first dye diffusion portion 132 to diffuse dye to the target), a second printing pass may be performed using the second dye panel 134, a third printing pass may be performed using the third dye panel 136, a fourth printing pass may be performed using the black mass transfer portion 140, a fifth printing pass may be performed using the protective mass transfer portion 160, and a sixth printing pass may be performed using the image-wise mass transfer portion 150 (e.g., to provide an image-wise security feature). Accordingly, for the example of FIG. 4, the image-wise mass transfer portion 150 is positioned to the right of the protective mass transfer portion 160, with printing from the protective mass transfer portion 160 being performed before printing from the image-wise mass transfer portion 150, resulting in a security feature from the images-wise mass transfer portion 150 being disposed above a uniform protective top coat provided via the protective mass transfer portion 160. While durability for such a printing may be reduced relative to the example of FIG. 1, more pronounced visual effects for the security feature may be accomplished using the arrangement of FIG. 4.

Figure 5:
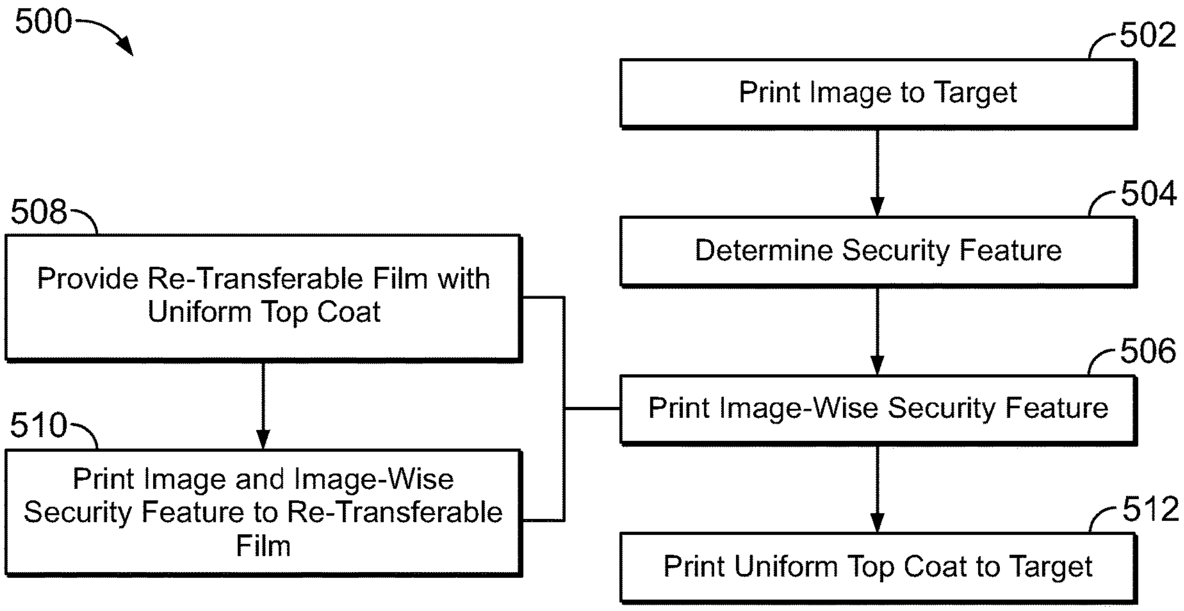
FIG. 5 provides a flowchart of a method according to an embodiment of the present disclosure.

FIG. 5 provides a flowchart of a method 500 for printing an object (e.g., printing on a target and providing an image-wise security feature), in accordance with various embodiments. The method 500, for example, may employ or be performed by structures or aspects of various embodiments (e.g., systems and/or methods) discussed herein. In various embodiments, certain steps may be omitted or added, certain steps may be combined, certain steps may be performed simultaneously, certain steps may be performed concurrently, certain steps may be split into multiple steps, certain steps may be performed in a different order, or certain steps or series of steps may be re-performed in an iterative fashion. In various embodiments, portions, aspects, and/or variations of the method 500 may be able to be used as one or more algorithms to direct hardware to perform one or more operations described herein.

At 502, an image is printed to a target. The personalized image may be added to a target substrate with techniques such as mass transfer printing, UV ink jet printing, laser engraving, or dye diffusion thermal transfer printing. The image in the depicted embodiment may be printed using dye diffusion printing using one or more dye diffusion panels. For example, three dye diffusion panels (yellow, magenta, cyan) may be used in some embodiments. The image may include, for example, one or more of a photograph (e.g., a photograph or portrait of a person), a logo, a signature, a drawing or figure, a background pattern, or the like. The target may be, for example, a card (e.g., credit card, debit card, identification card, driver's license). As another example, the target may be a re-transferable film to which the security feature is added, with the re-transferable film configured for subsequent application to an object. As another example of the use of the disclosed technique, the target to be printed is a re-transferable film to which the security feature is added for subsequent application to an object.

At 504, a security feature is determined. In the illustrated embodiment, the security feature is determined based upon the image (e.g., an image printed at 502). The security feature may be determined either before or after the printing of an image. In some embodiments, the image printed at 502 may include a photograph of a person. The security feature may be a lower resolution version or representation of the photograph, for example a line drawing corresponding to the photograph (e.g., a line drawing that represents a photograph, with the photograph in color and the line drawing not in color). As another example, the image may include a signature, and the security feature may include a copy of the signature. Accordingly, the security feature may be understood as corresponding to the content of the image, as the security feature either shares or represents content of the image. Further, the security feature may be uniquely tailored for a particular card based on an image unique to that card (e.g., a photograph and/or signature unique to the holder of a printed card or license). In various embodiments, the security feature may be autonomously or automatically determined, selected, and/or configured. For example, responsive to identification or provision of a photograph for a portion of an image of a card, a processing system associated with printing the card may automatically generate a line image representation of the content of the photograph, and print the line image representation on the card using a clear material from the image-wise mass transfer panel of the dye sheet.

At 506, an image-wise security feature (e.g., a security feature determined at 504) is printed to the target. In the illustrated embodiment, the image-wise security feature is printed to the target using a clear material transferred from an image-wise mass transfer panel of the dye sheet. The clear security feature may reflect light differently than a surrounding aspect of the target, providing a visual effect and allowing the security feature to be analyzed. Various embodiments accordingly provide for a security feature that may be determined and applied at a point of issuance (e.g., of a card or license), which may be uniquely tailored or customized for each individual card (e.g., including a representation of the holder of the card and/or a representation of a signature of the holder of the card). Because the security feature is provided with a separate printing technique than an image on the card itself (e.g., the security feature provided via a mass transfer of a clear material and the image provided via dye diffusion of various colors), the security feature provides a visual effect that is distinct and distinguishable from the image itself, or a feature of the card that is provided using the same technique as the image itself.

For an example embodiment, in which the security feature is provided to a re-transferable film, at 508, a re-transferable film is provided, with the uniform top coat pre-applied to the re-transferable film. For example, the top coat may form all or a part of a substrate of a target which will be printed upon. Then, at 510, the image and image-wise security feature are printed to the re-transferable film.

Another example of providing a uniform top coat, which may be used in embodiments in which the security feature is printed to a target such as a card without the use of a re-transferable film, is printing a uniform top coat to the target after printing an image and image-wise security feature. In contrast to the image-wise security feature (which is printed in a visually recognizable pattern over only a portion of the target), the uniform top coat is applied, in some embodiments, in a uniform coat over all or substantially all of the target. Generally, the uniform top coat is configured to provide protection to portions of the printed target disposed beneath the uniform top coat, thereby increasing the reliability, durability, and/or lifespan of the target. In some embodiments, both the uniform top coat and the image-wise security feature may be clear, but one may be more or less glossy, for example, due to an additive or a filler in a material transferred to the target and/or disposed in releasing sub-coat beneath the material transferred to the target. In some embodiments, the material mass transferred to the target for the uniform top coat and the image-wise security feature are the same (improving adhesion, for example), whereas in other embodiments the materials are different (providing a more striking or visible visual effect, for example). The substantially transparent mass transfer image-wise panel and protective top-coat do not substantially impact on the visibility of the printed image such that the color image is clearly visible in direct and reflected light and the security image is visible in reflected light. As discussed herein, in some embodiments, the uniform top coat is printed (e.g., via a mass transfer from a dye sheet under the influence of heat), while in other embodiments, the uniform top coat is part of a target (e.g., re-transferable film) onto which an image and image-wise security feature are printed.

For example, the top coat may be printed to a target during a printing process (e.g., a series of passes) in which the image and image-wise security feature are also printed to the target. For an example embodiment in which the security feature is printed to a target without the use of a re-transferable film, at 512, the uniform top coat is printed to the target (e.g., a card or license) from a protective mass transfer panel of a thermal transfer film. It may be noted that, as discussed herein, the order in which the uniform top coat is applied relative to other printed layers may vary in different embodiments. For example, the image may be printed first, followed by printing of the image-wise security feature, which is then followed by printing of the uniform top coat. As another example, the image may be printed first, followed by printing of the uniform top coat, which is then followed by printing of the image-wise security feature.

Figure 6:
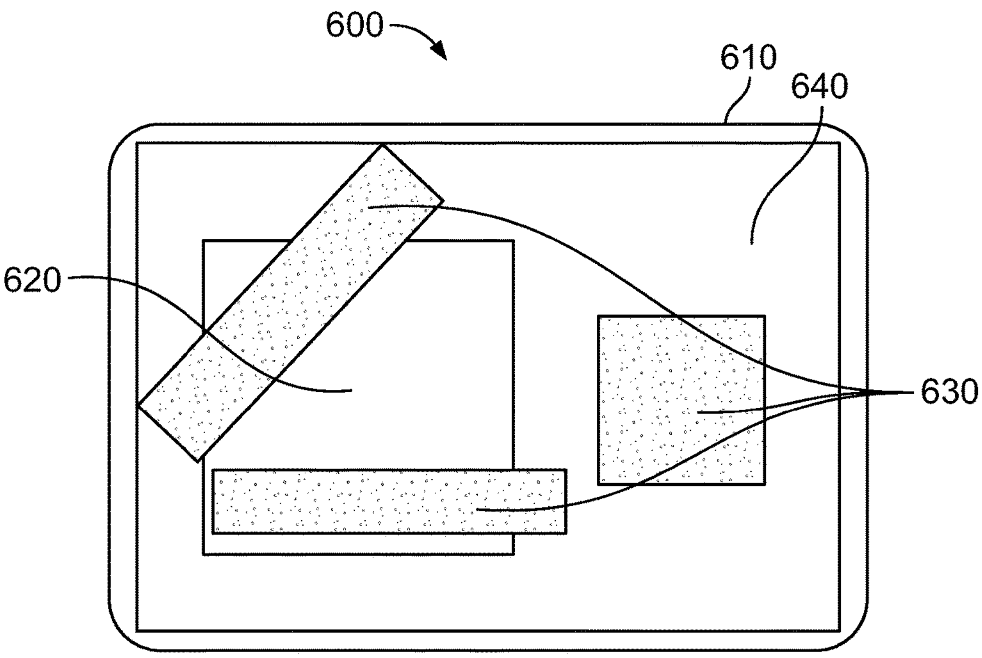
FIG. 6 provides a schematic view of a card in accordance with various embodiments.

Accordingly, as discussed herein, a card, license, or other printing target may be produced by various embodiments having an image-wise security feature, which may be individually or uniquely tailored or customized for the particular target, and/or which matches or otherwise corresponds to a unique image (e.g., photograph or signature, among others) displayed by an image of the particular target. FIG. 6 provides a schematic view of a card 600 in accordance with various embodiments, that includes a point-of-issuance security feature, or security feature that may be determined and provided at the point-of-issuance of the card 600. It may be noted that the card 600 may be produced, for example, using thermal transfer sheet 100 and/or method 500 discussed herein.

As seen in FIG. 6, the card 600 includes a base 610, an image 620, an image-wise security feature 630, and a protective top coat 640. The base 610, for example, may be a blank card or similar structure configured to receive printing.

The image 620 is printed on the base 610. For example, the image 620 in various embodiments is a color image printed using multiple dye diffusion panels (e.g., yellow, magenta, cyan) during a thermal printing process. The image 620 may include one or more of a photograph (e.g., of a card holder); a signature; a name, identification number, or other alphanumeric code; informational text (e.g., information describing or corresponding to a card holder); a background pattern or scene; a solid color background; or a logo or mark.

In the illustrated embodiment, the image-wise security feature 630 includes a clear material and is printed on the base. For example, the image-wise security feature may be printed on the base using an image-wise mass transfer panel of a dye sheet as discussed herein. A number of image-wise security features 630 are shown in FIG. 6. For example, one image-wise security feature 630 is shown to a side of the image 620 in the illustrated portion. Also, two image-wise security features 630 are shown printed at least partially on top of the image 620. It may be noted that while one image 620 and three image-wise security features 630 are shown in FIG. 6, other numbers of images (e.g., more than one) 620 and/or other numbers of image-wise security features 630 (e.g., one, two, or four, among others) may be employed in various embodiments. The image 620 and/or the image-wise security feature 630 in various embodiments is selected, determined or configured at a point-of-issuance of the card 600 shortly before printing of the card 600. For example, a photograph, signature, or other distinguishing pattern or mark associated with the card holder may be obtained at the point-of-issuance, and used to generate all or a portion of the image 620 and/or the image-wise security feature 630. Accordingly, the image 620 and/or the image-wise security feature 630 are unique to an individual card and card holder in various embodiments. Use of an image-wise security feature that is unique to the card holder and visually recognizable as associated with the card holder (e.g., a photograph or representation thereof, a signature or representation thereof) provides enhanced security in various embodiments. The image-wise security feature 630 in the illustrated embodiment is printed with a clear material that reflects light differently (e.g., due to its positioning on top of and/or below other printed layers or portions) than other parts of the card 600.

In some embodiments, the image-wise security feature 630 corresponds to the image 620. The image-wise security feature 630 (or a portion thereof) may match or represent all or a portion of the image 620. In one example embodiment, the content of the image 620 includes a photograph, and the image-wise security feature 630 includes a representation of the photograph. For instance, the image-wise security feature 630 may include a line drawing representing the photograph in a clear material. In another example embodiment, the content of the image 620 includes a signature, and the image-wise security feature 630 includes a representation of the signature. It may be noted that in some embodiments, the image-wise security feature 630 corresponds to content of the image 630, with the image-wise security feature 630 at a lower resolution than the content of the image 620 to which the image-wise security feature 630 corresponds. For example, a line drawing representing the appearance of the card holder that is included in the image-wise security 630 feature may be at a lower resolution than a photograph representing the appearance of the card holder that is included in the image 620.

The protective top coat 640 is uniformly applied over the base 600. The protective top coat 640, for example, may be made of a clear polymer that is transferred from a mass transfer portion of a dye sheet during a thermal printing process. For instance, the image 620 may be produced using dye that is diffused into the base 600, while the image-wise security feature 630 and the protective top coat 640 are produced using material (e.g., clear polymer(s)) mass transferred onto a surface of the base 600 (or onto a previous printed portion or portions transferred onto the surface of the base 600). In some embodiments, the protective top coat 640 is disposed above both the image 620 and the image-wise security feature 630, while in other embodiments the protective top coat 640 is disposed above the image 620 but beneath the image-wise security feature.

It may be noted that the image-wise security feature 630, in combination with the protective top coat 640, provide an example of a visual security feature disposed on a target, with the visual security feature including two substantially transparent layers, wherein at least one of the two substantially transparent layers is present in an image-wise pattern.

Different examples of the apparatus(es) and method(s) disclosed herein include a variety of components, features, and functionalities. It should be understood that the various examples of the apparatus(es) and method(s) disclosed herein may include any of the components, features, and functionalities of any of the other examples of the apparatus (es) and method(s) disclosed herein in any combination, and all of such possibilities are intended to be within the spirit and scope of the present disclosure.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like (e.g., before and after may be inverted).

It should be noted that the particular arrangement of components (e.g., the number, types, placement, or the like) of the illustrated embodiments may be modified in various alternate embodiments.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein. Instead, the use of "configured to" as used herein denotes structural adaptations or characteristics, and denotes structural requirements of any structure, limitation, or element that is described as being "configured to" perform the task or operation.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments without departing from their scope. While the dimensions and types of materials described herein are intended to define the parameters of the various embodiments, the embodiments are by no means limiting and are exemplary embodiments. Many other embodiments will be apparent to those of skill in the art upon reviewing the above description. The scope of the various embodiments should, therefore, be determined with reference to the appended claims, along with the full scope of equivalents to which such claims are entitled.

In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments, including the best mode, and also to enable any person skilled in the art to practice the various embodiments, including making and using any devices or systems and performing any incorporated methods. The patentable scope of the various embodiments is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A card comprising:

a base;

an image including content, wherein the image is provided on a surface of the base;

an image-wise security feature provided on the surface of the base, wherein the image-wise security feature is substantially transparent and represents at least some of the content of the image, the image-wise security feature including a clear polymer material and providing a visual effect that is distinct and distinguishable from the image; and a protective top coat that is substantially transparent and applied onto the surface of the base, covering the image and the image-wise security feature, wherein the protective top coat includes the clear polymer material.

2. The card of claim 1, wherein the image-wise security feature is at a lower resolution than the content of the image.

3. The card of claim 1, wherein the image comprises a photograph, and the image-wise security feature is a line representation of at least a portion of the photograph.

4. The card of claim 1, wherein the image comprises text, and the image-wise security feature is a representation of the text.

5. The card of claim 1, wherein the image-wise security feature at least partially overlaps the image.

6. The card of claim 1, wherein the image and the image-wise security feature are unique to a card holder that is associated with the card.

7. The card of claim 1, wherein the image-wise security feature has a more matte appearance than the protective top coat.

8. The card of claim 1, wherein the image is provided by a dye that diffuses into the base.

9. The card of claim 1, wherein the image is a color image.

10. The card of claim 1, wherein the clear polymer material of the image-wise security feature includes an additive, and the clear polymer material of the protective top coat is additive free.

11. The card of claim 1, wherein the image-wise security feature has the same material composition as the protective top coat.

12. The card of claim 1, wherein the image comprises a signature, and the image-wise security feature is a representation of the signature.

13. The card of claim 1, wherein the protective top coat is a uniform coating that covers all of the surface of the base.

14. A card comprising:

a base;

an image including content, wherein the image is provided on a surface of the base;

a protective top coat that is substantially transparent and includes a clear polymer material, the protective top coat applied onto the surface of the base, covering the image; and an image-wise security feature applied over the protective top coat such that the protective top coat is disposed between the image-wise security feature and the image, wherein the image-wise security feature is substantially transparent and represents at least some of the content of the image and provides a visual effect that is distinct and distinguishable from the image and wherein the image-wise security feature includes the clear polymer material of the protective top coat.

15. The card of claim 14, wherein the image comprises a photograph, and the image-wise security feature is a line representation of at least a portion of the photograph.

16. The card of claim 14, wherein the image comprises a signature, and the image-wise security feature is a representation of the signature.

17. The card of claim 14, wherein the protective top coat is a uniform coating that covers all of the surface of the base.

18. The card of claim 14, wherein the image-wise security feature at least partially overlaps the image.

19. The card of claim 14, wherein the clear polymer material of the image-wise security feature includes an additive, and the clear polymer material of the protective top coat is additive free.

* * * * *